(12) United States Patent
Chen et al.

(10) Patent No.: US 12,440,249 B2
(45) Date of Patent: Oct. 14, 2025

(54) TRUMPET EXPANDABLE VERTEBRAL DEVICE AND ASSEMBLY THEREOF

(71) Applicant: BioLife Medical Device Inc., HsinChu (TW)

(72) Inventors: Li-Sen Chen, Hsinchu (TW); Che-Yang Chao, Hsinchu (TW); Wei-Tai Jao, Hsinchu (TW)

(73) Assignee: BIOLIFE MEDICAL DEVICE INC., Hsinchu (TW)

( * ) Notice: Subject to any disclaimer, the term of this patent is extended or adjusted under 35 U.S.C. 154(b) by 157 days.

(21) Appl. No.: 18/469,916

(22) Filed: Sep. 19, 2023

(65) Prior Publication Data

US 2024/0000488 A1     Jan. 4, 2024

Related U.S. Application Data

(63) Continuation-in-part of application No. 17/120,194, filed on Dec. 13, 2020, now abandoned.

(30) Foreign Application Priority Data

Sep. 22, 2022 (TW) .................................. 111135949

(51) Int. Cl.
    *A61B 17/70*     (2006.01)
(52) U.S. Cl.
    CPC ...... *A61B 17/7097* (2013.01); *A61B 2560/02* (2013.01)

(58) Field of Classification Search
    CPC ............ A61B 17/7266; A61B 17/7275; A61B 17/8858; A61B 17/7032; A61B 17/7065; A61F 2/4611; A61F 2/446
See application file for complete search history.

(56) References Cited

U.S. PATENT DOCUMENTS

| | | | | |
|---|---|---|---|---|
| 3,708,883 | A * | 1/1973 | Flander | A61C 8/0075 433/174 |
| 8,211,156 | B2 * | 7/2012 | Andersen | A61B 17/8685 411/913 |
| 8,574,275 | B2 * | 11/2013 | Stone | A61B 17/0401 606/313 |
| 8,986,345 | B2 * | 3/2015 | Denham | A61B 17/0401 606/232 |
| 8,986,386 | B2 * | 3/2015 | Oglaza | A61F 2/4611 606/90 |
| 10,555,820 | B2 | 2/2020 | Tsend et al. | |
| 2002/0049447 | A1 * | 4/2002 | Li | A61B 17/68 606/313 |

(Continued)

FOREIGN PATENT DOCUMENTS

EP     3841992 B1     6/2024

*Primary Examiner* — Matthew J Lawson
(74) *Attorney, Agent, or Firm* — Tung & Associates

(57) ABSTRACT

A trumpet expandable vertebral device, includes: a center shaft including a cylinder body and an expanding ring connected to each other, wherein the cylinder body has a far end which has an outer thread; and an expandable portion including an end collar, a connection part and plural expandable plates, wherein the expandable portion is located outside and surrounds the center shaft, and the connection part connects the end collar with the plurality of expandable plates; wherein when the expanding ring moves toward the end collar, the trumpet expandable plates are expanded.

11 Claims, 9 Drawing Sheets

(56) References Cited

U.S. PATENT DOCUMENTS

| | | | |
|---|---|---|---|
| 2007/0185490 A1* | 8/2007 | Implicito | A61B 17/025 606/249 |
| 2008/0177306 A1 | 7/2008 | Lamborne et al. | |
| 2010/0331881 A1* | 12/2010 | Hart | A61B 17/0401 606/232 |
| 2011/0306975 A1* | 12/2011 | Kaikkonen | A61B 17/7275 606/63 |
| 2014/0031940 A1* | 1/2014 | Banouskou | A61B 17/7065 623/17.16 |
| 2014/0100581 A1* | 4/2014 | Reimels | A61B 17/8858 606/99 |
| 2017/0119442 A1* | 5/2017 | Lee | A61B 17/8825 |
| 2017/0258600 A1* | 9/2017 | Tseng | A61B 17/8852 |
| 2020/0038070 A1* | 2/2020 | Suddaby | A61F 2/4405 |
| 2021/0145601 A1* | 5/2021 | Chen | A61B 17/7098 |
| 2021/0282826 A1* | 9/2021 | Oglaza | A61F 2/4455 |

* cited by examiner

TRUMPET EXPANDABLE VERTEBRAL DEVICE AND ASSEMBLY THEREOF

CROSS REFERENCE

The present invention is a continuation-in-part application of U.S. Ser. No. 17/120,194, filed on Dec. 13, 2020, and claims priority to TW 111135949, filed on Sep. 22, 2022.

BACKGROUND OF THE INVENTION

Field of Invention

The present invention relates to a trumpet expandable vertebral device; particularly, it relates to such a trumpet expandable vertebral device which, when inserted into a human body, ca trumpet expand itself so as to assist restoring a vertebra to its original shape, and an assembly thereof.

Description of Related Art

When a human spine (e.g. cervical vertebrae, thoracic vertebrae, lumbar vertebrae, etc.) suffers a compression fracture, or collapses due to poor bone mass density, a vertebral device which is inserted into the spine can help expand the space to restore the spine to a better condition. FIG. 1 shows a trumpet expandable vertebral device 1 which is disclosed in the parent application of this continuation-in-part application. The trumpet expandable vertebral device 1 includes a center shaft 2, expandable portion 4 (including expandable plates 4a), a nut 6 and an expanding ring 8 which surrounds the center shaft 2. The expanding ring 8 presses to expand the expandable plates 4a of the expandable portion 4. In such arrangement, to expand the expandable plates 4a by the expanding ring 8 requires relative rotation of the expanding ring 8 with respect to the center shaft 2, which may not be easily done.

Besides, the operation to insert and expand the trumpet expandable vertebral device 1 is performed within a human body; therefore, easier and more reliable operation is preferred so as not to increase the operation risk.

In view of the above, the present invention proposes a continuation improvement of the parent application, so that the operation can be performed in an easier and more reliable way.

SUMMARY OF THE INVENTION

From one perspective, the present invention provides a trumpet expandable vertebral device which comprises: a center shaft including a cylinder body and an expanding ring which are fixedly connected to each other, wherein the cylinder body has a near end which is connected to the expanding ring and a far end which is away from the expanding ring, wherein the far end has an outer thread; and an expandable portion including an end collar, a connection part and a plurality of expandable plates, arranged in the listed order in a direction from the far end of the cylinder body to the near end of the cylinder body, wherein the expandable portion is located outside and surrounds the center shaft, and the connection part connects the end collar with the plurality of expandable plates; wherein when the expanding ring moves toward the end collar, the plurality of expandable plates are expanded.

In one embodiment, the center shaft includes a hollow interior space for a bone filler material to be filled in and filled through the hollow interior space into a space between the center shaft and the plurality of expandable plates after the plurality of expandable plates are expanded, wherein after the bone filler material is solidified, the bone filler material assists maintaining a relative position between the center shaft and the plurality of expandable plates which are expanded and provides a strength to support an expanding degree of the plurality of expandable plates.

In one embodiment, the center shaft includes at least one lateral opening which communicates with the hollow interior space, and wherein the bone filler material flows toward the plurality of expandable plates from the hollow interior space through the at least one lateral opening.

In one embodiment, the center shaft includes an inlet and an outlet which communicate with the hollow interior space, wherein the inlet is located at a same end where the outer thread is located and the outlet is located at a same end where the expanding ring is located, and the bone filler material flows in the hollow interior space through the inlet and flows out the hollow interior space through the outlet.

In one embodiment, the expanding ring includes a ring shape edge or a cone shape.

In one embodiment, the expanding ring is a continuous part of a stiff structure of the center shaft.

In one embodiment, the expanding ring includes at least one edge to press against the plurality of expandable plates so as to expand the plurality of expandable plates.

In one embodiment, there is no nut mounted around the outer thread of the cylinder body, and there is no inner thread inside the end collar.

In one embodiment, each of the plurality of expandable plates has a thickness which increases from a tail end of the expandable plate which is away from the connection part to an end which is near the connection part.

In another aspect, the present invention provides a trumpet expandable vertebral device assembly, which comprises: a center shaft including a cylinder body and an expanding ring which are fixedly connected to each other, and a hollow interior space inside the cylinder body and the expanding ring, wherein the cylinder body has a near end which is connected to the expanding ring and a far end which is away from the expanding ring, wherein the far end has an outer thread, and wherein a largest outer diameter of the expanding ring is larger than an outer diameter of the cylinder body; an expandable portion including an end collar, a connection part and a plurality of expandable plates, arranged in the listed order in a direction from the far end of the cylinder body to the near end of the cylinder body, wherein the end collar, the connection part and the plurality of expandable plates are located outside and surround the cylinder body, and the connection part connects the end collar with the plurality of expandable plates, wherein when the expanding ring moves toward the end collar, the plurality of expandable plates are expanded; and an inner tube and an outer tube, wherein the inner tube includes an inner thread to match with and engage the outer thread of the cylinder body, and the outer tube encompasses and surrounds the inner tube and fits with the end collar, wherein a relative movement between the inner tube and the outer tube causes the expanding ring to move relatively to the plurality of expandable plates to expand or close the plurality of expandable plates.

In one embodiment, the inner tube includes a hollow inner space which communicates with the hollow interior space, and wherein a bone filler material is filled through the hollow inner space and the hollow interior space into a space between the center shaft and the plurality of expandable plates, wherein after the bone filler material is solidified, the bone filler material assists maintaining a relative position between the center shaft and the plurality of expandable plates which are expanded and provides a strength to support an expanding degree of the plurality of expandable plates.

In one embodiment, the trumpet expandable vertebral device assembly further comprises a handle which is fixedly connected with the inner tube, wherein a push or pull action of the handle controls the inner tube to move relatively to the outer tube. The handle includes an inner passage which communicates the hollow inner space of the inner tube with an exterior side of the handle, to allow a bone filler material to be filled through the inner passage, the hollow inner space of the inner tube and the hollow interior space, into a space between the center shaft and the plurality of expandable plates.

In one embodiment, each of the plurality of expandable plates has a thickness which increases from a tail end of the expandable plate which is away from the connection part to an end which is near the connection part.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the components; however, the shown scale, shapes and sizes of the components can be modified in implementation.

Figure 1:
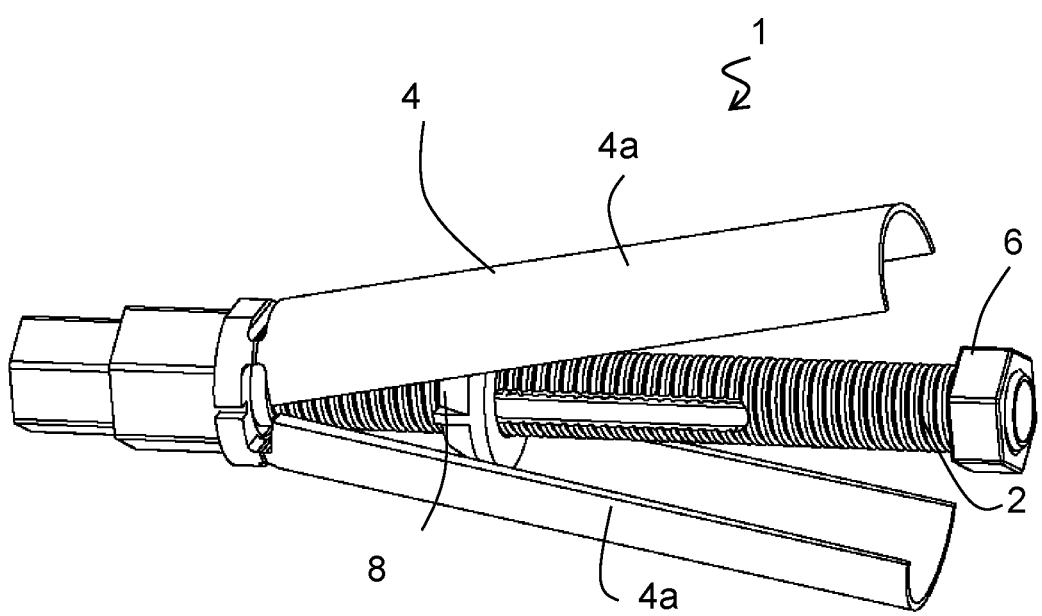
FIG. 1 shows a trumpet expandable vertebral device according to the parent application of the present continuation-in-part application.
Figure 2A:
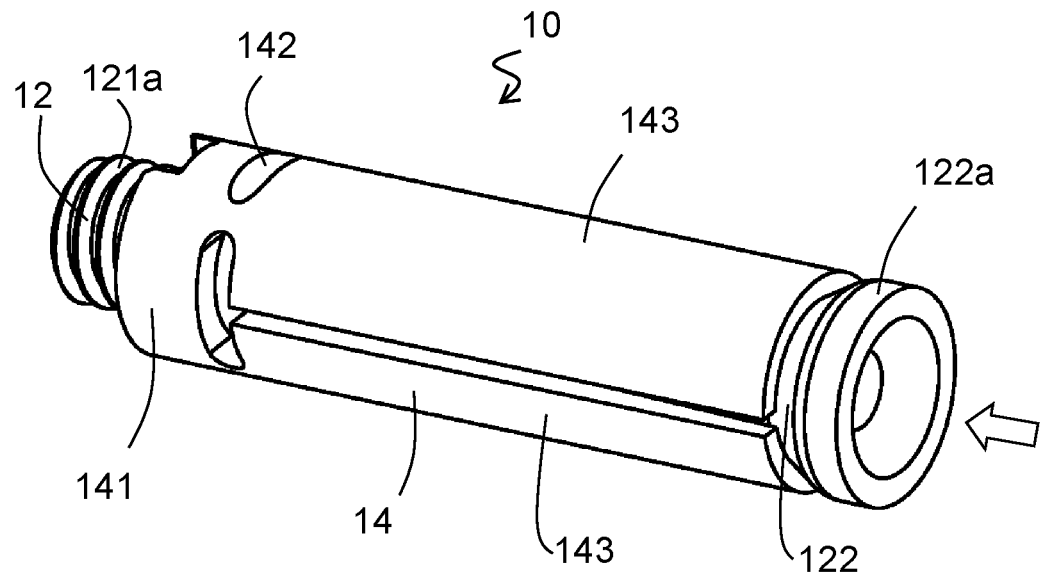
FIGS. 2A and 2B show an embodiment of a trumpet expandable vertebral device according to the present invention in closed and expanded states, respectively.
Figure 2B:
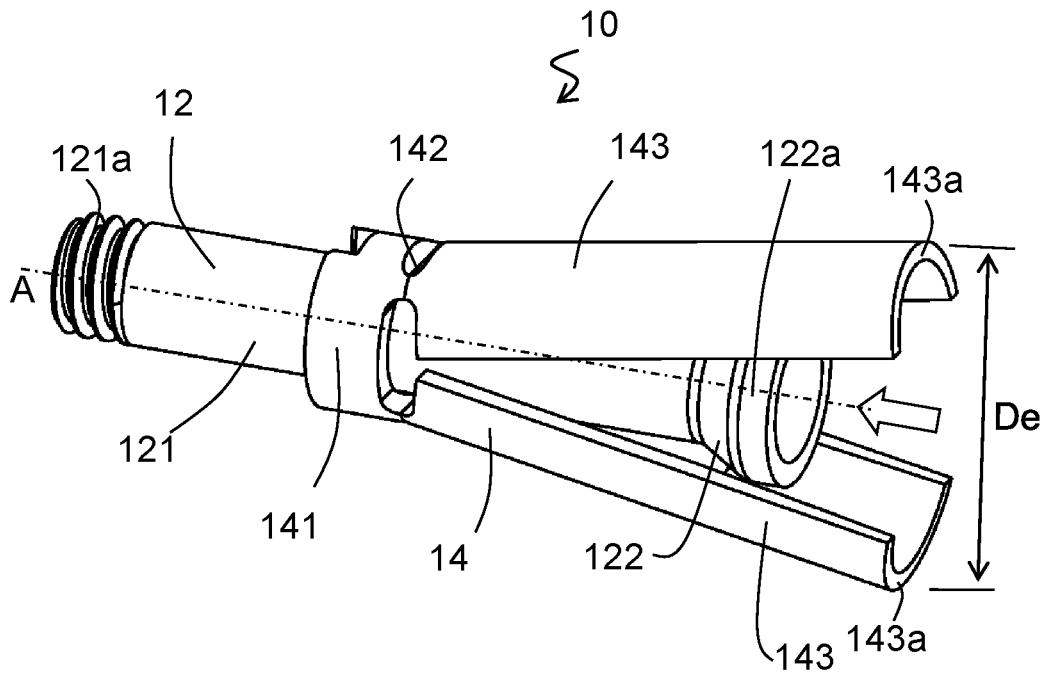

Please refer to FIGS. 2A-2B, which show an embodiment of a trumpet expandable vertebral device according to the present invention in closed and expanded states, respectively. The trumpet expandable vertebral device 10 includes: a center shaft 12 and an expandable portion 14. The center shaft 12 includes a cylinder body 121 and an expanding ring 122 which are fixedly connected to each other. The cylinder body 121 has a near end which is connected to the expanding ring 122 and a far end which is away from the expanding ring 122, wherein the far end has an outer thread 121a. Also referring to FIGS. 3A-3B, the largest outer diameter D1 of the expanding ring 122 (i.e., the outer diameter D1 of the edge 122a) is larger than the outer diameter D2 of the cylinder body 121. The expandable portion 14 includes an end collar 141, a connection part 142 and plural expandable plates 143, arranged in the listed order in a direction from the far end of the cylinder body 121 to the near end of the cylinder body 121. The end collar 141, connection part 142 and expandable plates 143 are located outside and surround the cylinder body 121, and the connection part 142 connects the end collar 141 and the expandable plates 143. In a preferred embodiment, the thickness of each of the expandable plates 143 increases from an end which is away from the connection part 142 to an end which is near the connection part 142. Referring to the hollow arrows in FIGS. 2A-2B, when the expanding ring 122 moves toward the end collar 141, the expandable plates 143 are expanded by the expanding ring 122 (as shown by FIGS. 2A-2B).

In another embodiment, the expanding ring 122 does not have to be located at one end of the center shaft 12 (for example, the cylinder body 121 can penetrate and protrude from the expanding ring 122). The expanding ring 122 is shown to have a cone shape body part in the embodiment of FIGS. 2A-2B, with increasing outer diameters; however in another embodiment, the expanding ring 122 can simply be an outer ring which does not have a body part, or, the expanding ring 122 can have a body part which is not a cone shape.

The expandable portion 14 is located outside and surrounds the center shaft 12. The expandable portion 14 includes plural expandable plates 143; the number of the expandable plates 143 is shown as two in the embodiment of FIGS. 2A-2B, which is an illustrative example and the number of the expandable plates 143 can be modified as required. Preferably, the thickness of each of the expandable plates 143 increases from an end 143a (referred to as tail end 143a hereinafter) which is away from the connection part 142 to an end which is near the connection part 142, whereby, a movement of the expanding ring 122 along an axis A (i.e., the center axis of the center shaft 12) farther into the expandable portion 14 can expand the expandable plates 143 wider (i.e., larger distance De). The end collar 141 is capable of being mounted on and around the center shaft 12. When relative relationship between the end collar 141 and the center shaft 12 is set, for example by a tool (which will be explained when describing another embodiment), a bone filler material can be filled in the empty space to fix the center shaft 12 within the expandable portion 14, with the set relative relationship in between. The connection part 142 is located between and connects the expandable plates 143 and the end collar 141; the connection part 142 can be flexible deformed to allow the expandable plates 143 to expand. As the expandable plates 143 are expanded by the expanding ring 122, there will be a distance De between the tail ends 143a of the expandable plates 143. The present invention is different from the parent application in that the expanding ring 122 is fixed onto (is a part of) the center shaft 12, and by adjusting the relative relationship between the center shaft 12 and the end collar 141, the expanded degree of the expandable plates 143 can be adjusted, which is easier and more reliable in terms of performing surgical operation. In addition, because the expanding ring 122 is fixed onto (is a part of) the center shaft 12, the mechanical strength of the present invention is better than the parent application; during expanding the expandable plates 143, the expanding ring 122 is less likely to dislocate from the set position.

In one embodiment, the expandable portion 14 and the center shaft 12 can be made of a material containing titanium, or a material which is not toxic nor causing allergic reaction and has a sufficiently high mechanical strength.

In one embodiment, the expandable plates 143 are expanded to expand a space within a human spine, and the distance between the tail ends 143a is adjustable according to requirement for restoring a vertebra to a healthier state.

It should be noted that, in the trumpet expandable vertebral device 10 according to the present invention, because the expanding ring 122 is a continuous part of a stiff structure of the center shaft 12 and is not rotatable relative to the center shaft 12 (as the parent application), the stiffness of the expanding ring 122 is stronger and can support the expandable plates 143 to expand and resist stronger counter force. In operation, a surgical doctor can adjust the relative position between the center shaft 12 and the expandable portion 14 by moving the center shaft 12 relatively to the end collar 141, to expand the expandable plates 143 so that the tail ends 143a expand outwardly (i.e., the connection part 142 expand outwardly).

Figure 3A:
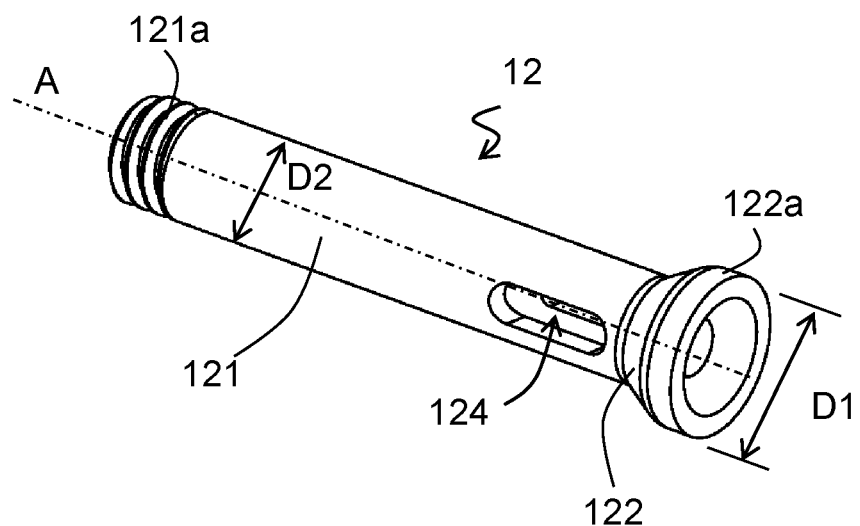
FIGS. 3A and 3B show different views of a center shaft of the trumpet expandable vertebral device of the embodiment of FIGS. 2A and 2B, respectively.
Figure 3B:
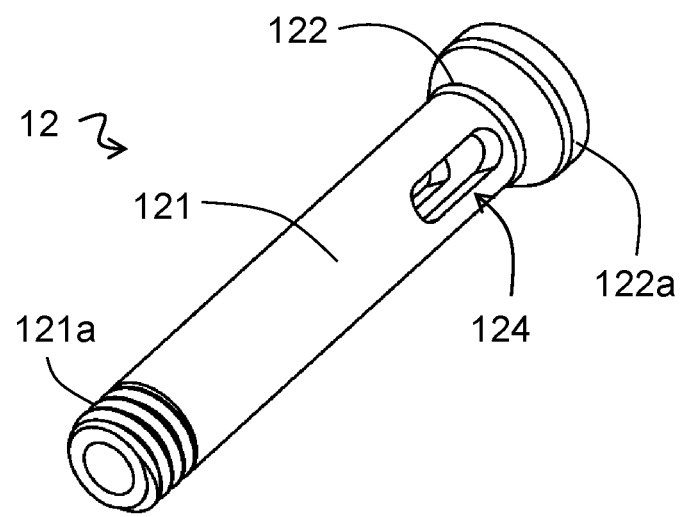

Please refer to FIGS. 3A-3B. In one embodiment, the expanding ring 122 substantially has a cone-ring shape, and the largest outer diameter D1 of the expanding ring 122 (i.e., the outer diameter D1 of the edge 122a which is the outer periphery of the expanding ring 122) is larger than the outer diameter D2 of the cylinder body 121. In one embodiment, when the expanding ring 122 enters a space formed after the expandable plates 143 are expanded, the edge 122a presses against the internal surfaces of the expandable plates 143, so that when the human body exerts a counter force to close the expandable plates 143, because the edge 122a presses against the internal surfaces of the expandable plates 143, the expandable plates 143 can be held in the desired positions.

Figure 4:
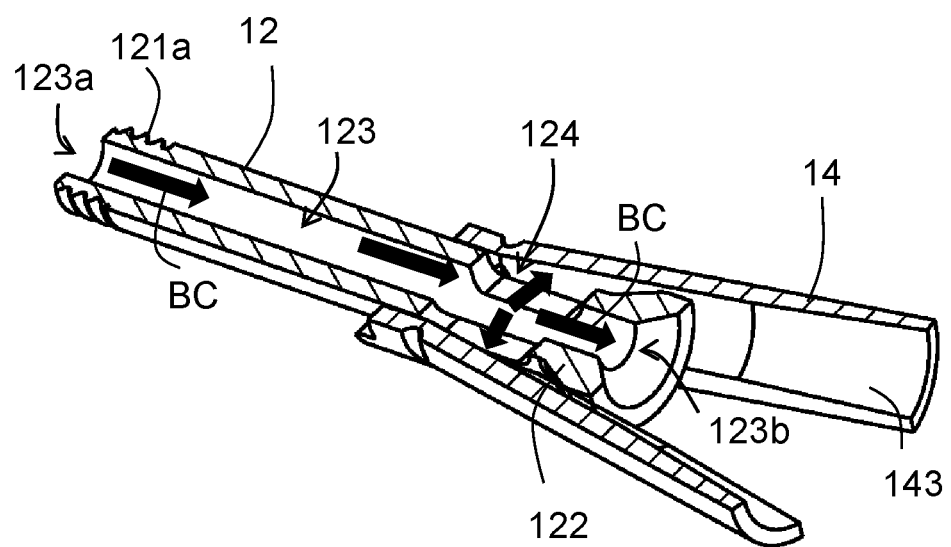
FIG. 4 shows how a bone filler material can flow in the trumpet expandable vertebral device according to the present invention.

Referring to FIG. 4, in one embodiment, the center shaft 12 includes a hollow interior space 123. After the trumpet expandable vertebral device 10 is inserted into a space between, e.g., a human spine, a bone filler material BC can be filled into the hollow interior space 123 and the space between the center shaft 12 and the expandable plates 143. After the bone filler material BC is solidified, the bone filler material BC can assist maintaining a relative position between the center shaft 12 and the expandable plates 143 which are expanded, and can provide strength to support the expanding degree. Examples of the bone filler material BC are, e.g., bone cement or bone graft, etc.

In one embodiment, as shown in FIGS. 3A-3B and 4, there is one or more lateral openings 124 provided at the lateral surface of the center shaft 12 (the number of the lateral openings 124 is shown to be two, but in other embodiments, the number can be different and is not limited to two). The lateral openings 124 is connected with the hollow interior space 123 so that the bone filler material BC can flow through the hollow interior space 123 and the lateral openings 124 toward the space near the expandable plates 143. In one embodiment, there is at least one inlet 123a of the hollow interior space 123 and at least one outlet 123b of the hollow interior space 123. The inlet 123a is located at the same end where the outer thread 121a is located (or, surrounded by the outer thread 121a), and the outlet 123b is located at the same end where expanding ring 122 is located (or, surrounded by the expanding ring 122). The bone filler material BC can be filled in through the inlet 123a, and can flow out from the hollow interior space 123 through the lateral openings 124 and the outlet 123b. In a preferred embodiment, the inlet 123a and the outlet 123b are located at opposite ends of the center shaft 12.

A further difference between the present invention and the parent application is that the present invention does not require a nut mounted around the outer thread 121a of the cylinder body 121 to lock the end collar 141, and also does not require to provide inner thread inside the end collar 141; therefore, the present invention is simpler in manufacture, assembling and operation.

Figure 5A:
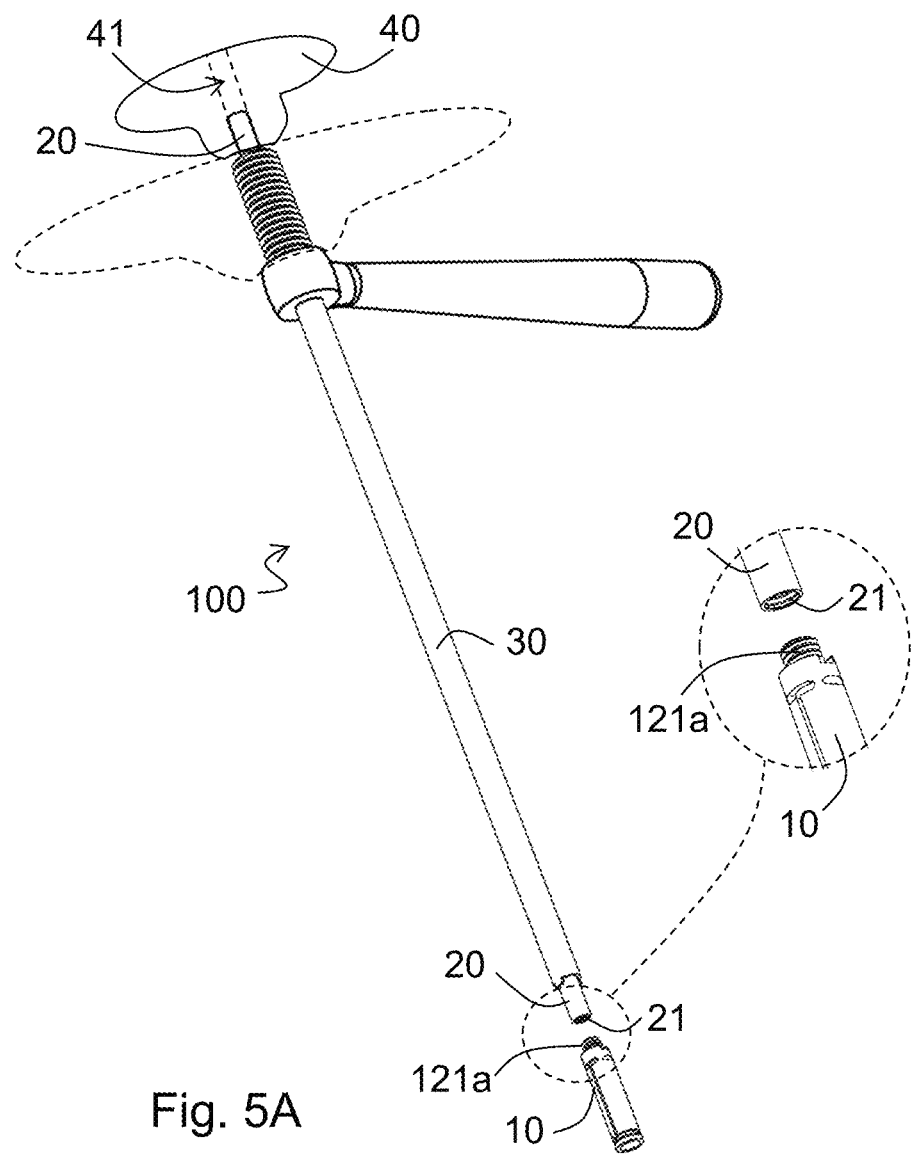
FIGS. 5A-5D show an embodiment of an assembly of a trumpet expandable vertebral device according to the present invention, and how the assembly operates.
Figure 5B:
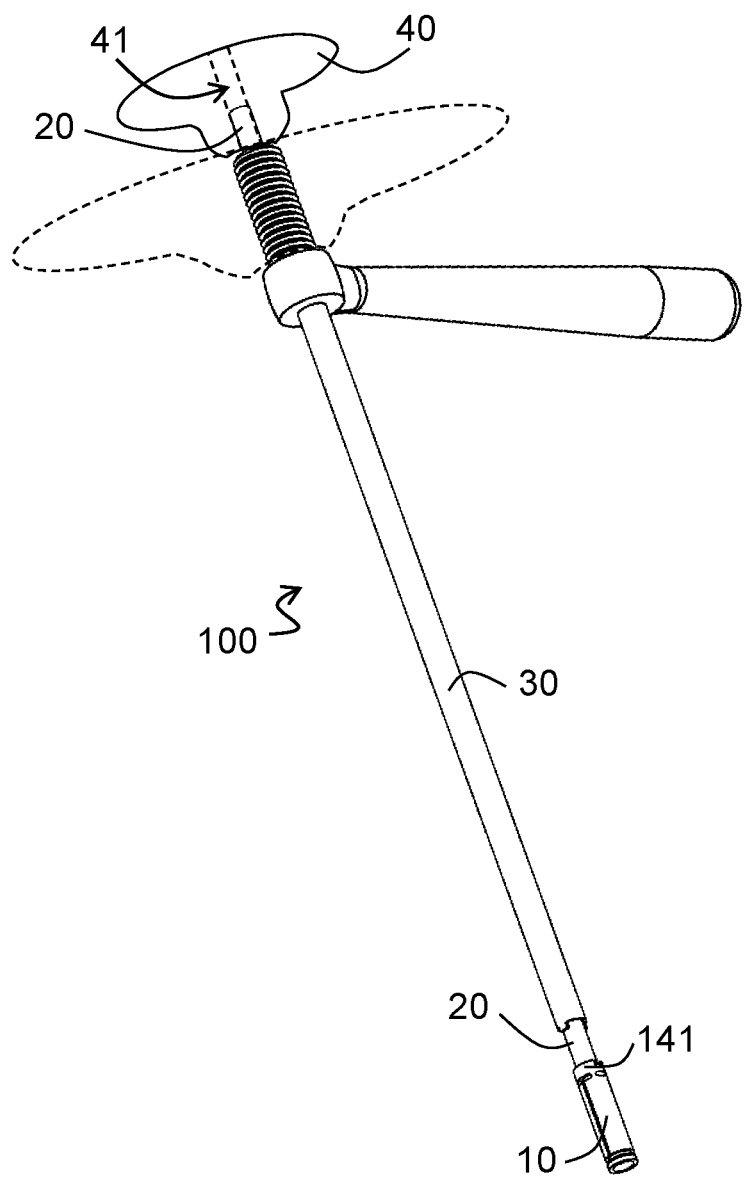
Figure 5C:
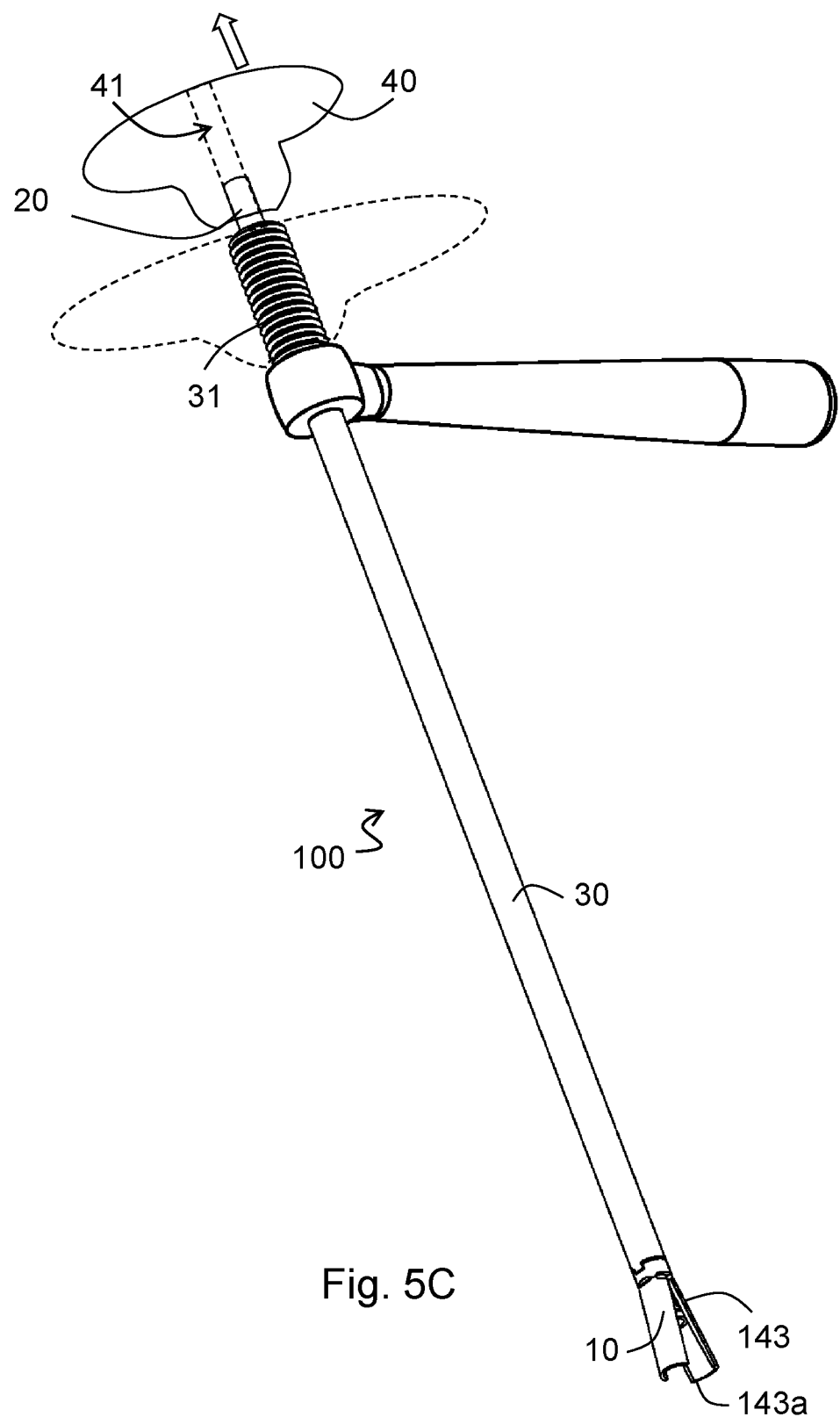

FIGS. 5A-5D show an embodiment of an assembly of a trumpet expandable vertebral device according to the present invention, and how the assembly operates. The figures show how to operate an assembly of the trumpet expandable vertebral device 10 (including the center shaft 12 and the expandable portion 14), an inner tube 20 and an outer tube 30. In one aspect, the present invention provides a trumpet expandable vertebral device assembly 100, which includes the center shaft 12 and the expandable portion 14 as described previously, and the inner tube 20 and the outer tube 30. The inner tube 20 includes an inner thread 21 (FIG. 5A) which can match with and engage the outer thread 121a of the center shaft 12 (i.e., of the cylinder body 121) so that the inner tube can be tightly connected with the center shaft 12. The outer tube 30 encompasses the inner tube 20 and can fit with the end collar 141 (FIGS. 5B-5C). In a surgical operation to insert the trumpet expandable vertebral device 10 into a human body, a surgical doctor operates to thread the inner tube 20 in connection with the center shaft 12 and fit the outer tube 30 with the end collar 141; afterward, the surgical doctor pulls the inner tube 20 relative to the outer tube 30, which causes the center shaft 12 to move relative to the end collar 141, whereby the expanding ring 122 expands the expandable plates 143; the surgical doctor can control the axial movement to adjust the expanded degree of the tail ends 143a of the expandable plates 143.

In another embodiment, in the final product of the trumpet expandable vertebral device 10, the inner thread 21 of the inner tube 20 has already been tightly connected with the outer thread 121a of the center shaft 12 (i.e., of the cylinder body 121), that is, the steps of FIGS. 5A-5B have been pre-accomplished, so that the surgical doctor does not need to connect them during operation.

Figure 5D:
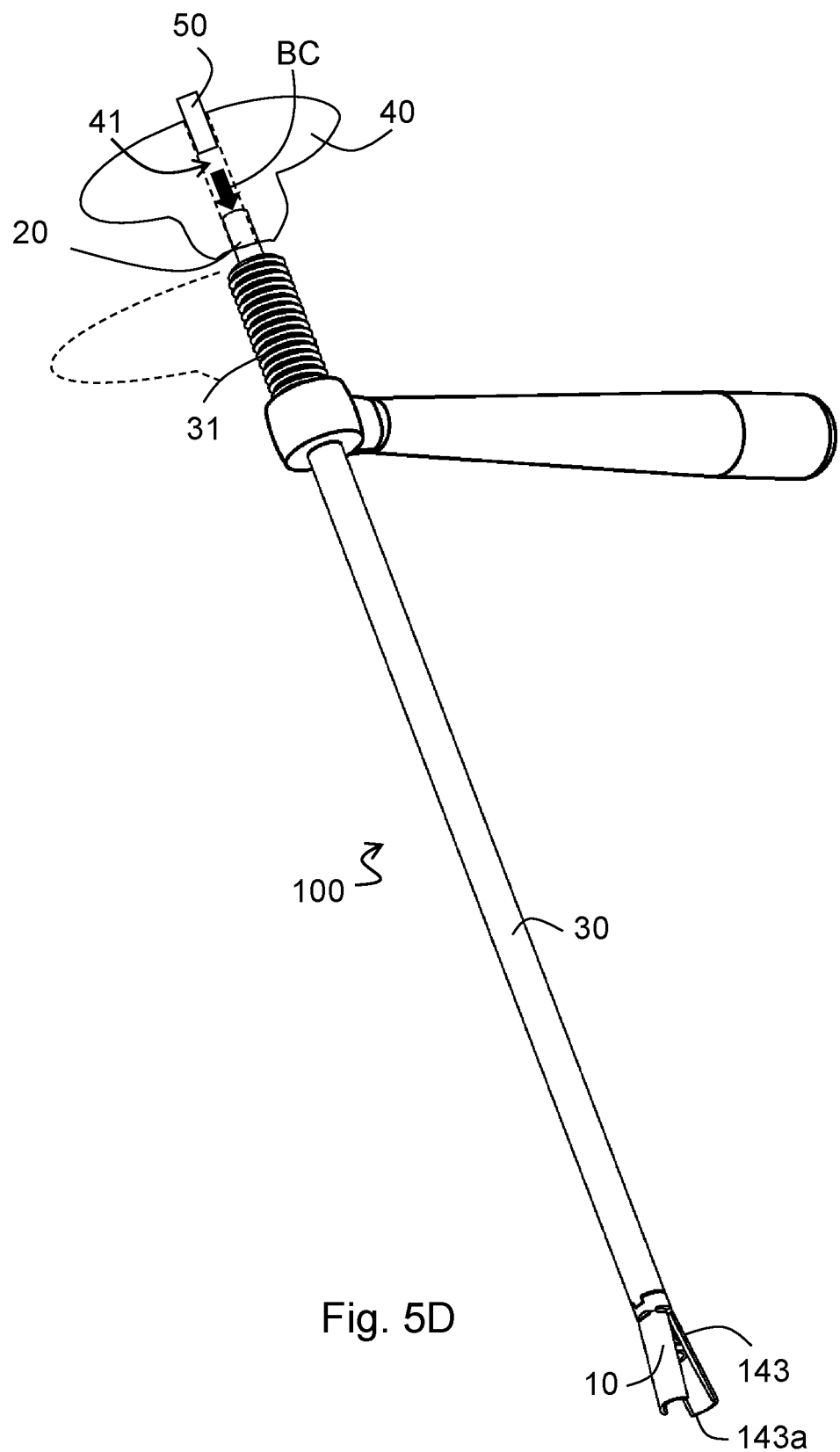

In one embodiment, referring to FIGS. 2B, 4 and 5D, when the center shaft 12 and the expandable portion 14 has been inserted into a human body, the inner tube 20 also has a hollow inner space which communicates with the hollow interior space 123 of the center shaft 12, so that a bone filler material BC can be filled through the inner tube 20 (FIG. 5D) to the hollow interior space 123 (FIG. 4D), and outflows from the hollow interior space 123 to the space between the center shaft 12 and the expandable portion 14; the outflowing bone filler material BC can fill into the space in the human spine (such as in the space of a vertebrae). After the bone filler material BC is solidified, the bone filler material BC can provide strength to support the expanding degree.

In one embodiment, after the trumpet expandable vertebral device 10 is in a desired state and the bone filler material BC is filled, the inner tube 20 and the outer tube 30 are removed.

Referring to FIGS. 5A-5D, In one embodiment, the trumpet expandable vertebral device assembly 100 further includes a handle which is fixedly connected with the inner tube 20. The connection between the handle 40 and the inner tube 20 can be achieved by, for example but not limited to, in-mode injection, press-fit, locking, welding, etc. The handle 40 can push or pull (the hollow arrow in FIG. 5C shows the pull action) to control the inner tube 20 to move relatively to the outer tube 30. The handle includes an inner passage 41, which can communicate the hollow inner space of the inner tube 20 with an exterior side of the handle whereby the bone filler material BC can be filled through the inner passage 41, the hollow inner space of the inner tube 20, and the hollow interior space 123, into the space between the center shaft 12 and the expandable plates 143.

In one embodiment, the trumpet expandable vertebral device assembly 100 further includes a push rod 50 (FIG. 5D), to assist pushing the bone filler material BC into the inner tube 20. In addition, it may be required to fine-adjust the relative movement or relative position of the inner tube 20 with respect to the outer tube 30; this can be controlled by a fine movement control mechanism which can be provided on or connected to the handle 40.

Figure 6A:
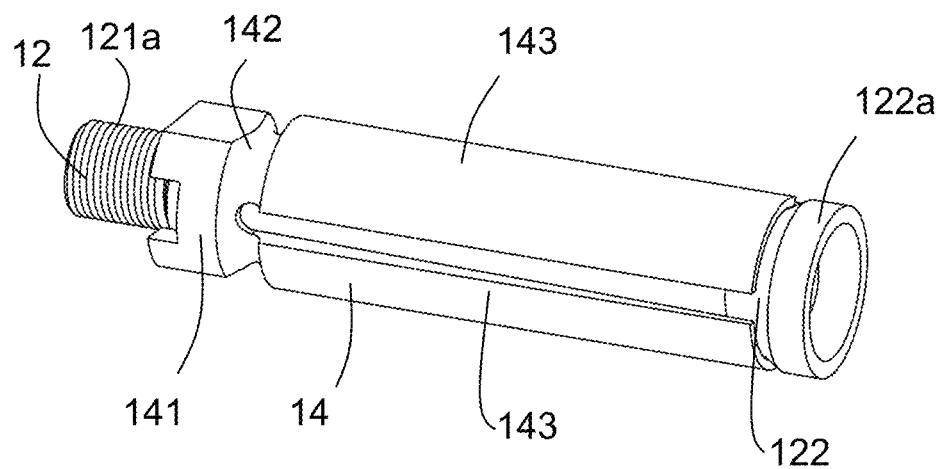
FIGS. 6A and 6B show another embodiment of a trumpet expandable vertebral device according to the present invention in closed and expanded states, respectively.
Figure 6B:
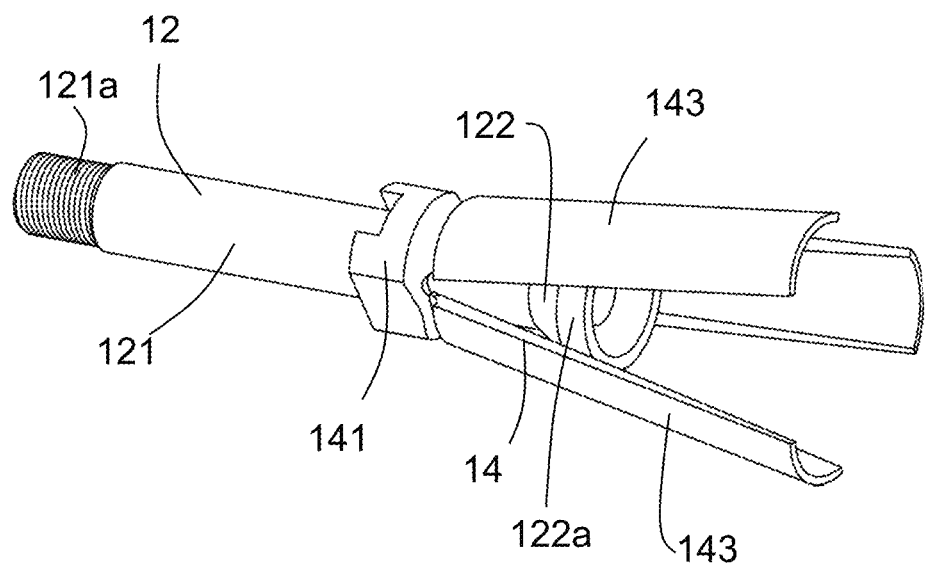

According to the present invention, the number of the expandable plates 143 is plural. The number of the expandable plates 143 is shown to be two in the embodiment of FIGS. 2A-2B, but this is not to limit the scope of the present invention. As shown in FIGS. 6A-6B, the number of the expandable plates 143 can be three. Certainly, the number of the expandable plates 143 can be any other plural number.

The present invention has several merits: first, the trumpet expandable vertebral device according to the present invention has stronger structural strength; second, the number of components of the trumpet expandable vertebral device according to the present invention is less, and the operation is easier; third, that the relative position between the center shaft and the expandable plates is not fixed by a nut, but instead is fixed by the solidified bone filler material, can save the operation time to screw the nut; besides, the bone filler material is solidified in a short time, so the operation time is faster, which means that the operation risk is reduced; fourth, there is a significant distance between the outer thread on the center shaft and the expanding ring, to provide a wide adjustment range; and fifth, after the trumpet expandable vertebral device is inserted into the human body, the inner tube and the outer tube can be removed easily, so the operation efficiency is better.

The present invention has been described in considerable detail with reference to certain preferred embodiments thereof. It should be understood that the description is for illustrative purpose, not for limiting the scope of the application of the present invention. An embodiment or a claim of the present invention does not need to be regarded as having to achieve all the objectives or advantages of the present invention. Those skilled in this art can readily conceive variations and modifications within the spirit of the disclosure in this specification, which should therefore be included in the scope of the following claims. For example, as long as the primary objective is attained, other extra components can be added, or, components that are given separate reference numbers and described as separate items can be combined into one piece. As another example, the shape of the expandable plates can be modified. In view of the foregoing, the spirit of the present invention should cover all such and other modifications and variations, which should be interpreted to fall within the scope of the following claims and their equivalents.

What is claimed is:

1. A trumpet expandable vertebral device, comprising:
    a center shaft including a cylinder body and an expanding ring which are fixedly connected to each other, wherein the cylinder body has a near end which is connected to the expanding ring and a far end which is away from the expanding ring, wherein the far end has an outer thread; and
    an expandable portion including an end collar, a connection part and a plurality of expandable plates, arranged in the listed order in a direction from the far end of the cylinder body to the near end of the cylinder body, wherein the expandable portion is located outside and surrounds the center shaft, and the connection part flexibly connects the end collar with the plurality of expandable plates;
    wherein the expanding ring has an outer diameter larger than an outer diameter of the cylinder body and moves axially and linearly toward the end collar, to cause the plurality of expandable plates to expand outwardly in a trumpet-shaped manner, whereby tail ends of the plurality of expandable plates are displaced outwardly, increasing a spacing therebetween;
    wherein the center shaft includes a hollow interior space for a bone filler material to be filled in and filled through the hollow interior space into a space between the center shaft and the plurality of expandable plates after the plurality of expandable plates are expanded, wherein after the bone filler material is solidified, the bone filler material assists maintaining a relative position between the center shaft and the plurality of expandable plates which are expanded and provides a strength to support an expanding degree of the plurality of expandable plates;
    wherein the center shaft includes an inlet and an outlet which communicate with the hollow interior space, wherein the inlet is located at a same end where the outer thread is located and the outlet is located at a same end where the expanding ring is located, and the bone filler material flows in the hollow interior space through the inlet and flows out the hollow interior space through the outlet.

2. The trumpet expandable vertebral device of claim 1, wherein the center shaft includes at least one lateral opening which communicates with the hollow interior space, and wherein the bone filler material flows toward the plurality of expandable plates from the hollow interior space through the at least one lateral opening.

3. The trumpet expandable vertebral device of claim 1, wherein the expanding ring includes a ring shape edge or a cone shape.

4. The trumpet expandable vertebral device of claim 1, wherein the expanding ring is a continuous part of a stiff structure of the center shaft.

5. The trumpet expandable vertebral device of claim 1, wherein the expanding ring includes at least one edge to press against the plurality of expandable plates so as to expand the plurality of expandable plates.

6. The trumpet expandable vertebral device of claim 1, wherein there is no nut mounted around the outer thread of the cylinder body, and there is no inner thread inside the end collar.

7. The trumpet expandable vertebral device of claim 1, wherein each of the plurality of expandable plates has a thickness which increases from athe tail end of the expandable plate which is away from the connection part to an end which is near the connection part.

8. A trumpet expandable vertebral device assembly, comprising:
    a center shaft including a cylinder body and an expanding ring which are fixedly connected to each other, and a hollow interior space formed inside the cylinder body and the expanding ring, wherein the cylinder body has a near end which is connected to the expanding ring and a far end which is away from the expanding ring, wherein the far end has an outer thread, and wherein a largest outer diameter of the expanding ring is larger than an outer diameter of the cylinder body;
    an expandable portion including an end collar, a connection part and a plurality of expandable plates, arranged in the listed order in a direction from the far end of the cylinder body to the near end of the cylinder body, wherein the end collar, the connection part and the plurality of expandable plates are located outside and surround the cylinder body, and the connection part flexibly connects the end collar with the plurality of expandable plates;

wherein when the expanding ring moves axially and linearly toward the end collar, the plurality of expandable plates are expanded outwardly in a trumpet-shaped manner, whereby tail ends of the plurality of expandable plates are displaced outwardly, increasing a spacing therebetween; and an inner tube and an outer tube, wherein the inner tube includes an inner thread engaging with the outer thread of the cylinder body, and the outer tube encompasses and surrounds the inner tube and fits with the end collar, wherein a linear and axial relative movement between the inner tube and the outer tube causes the expanding ring to move toward the end collar, thereby expanding the plurality of expandable plates;

wherein the inner tube includes a hollow inner space which communicates with the hollow interior space, and wherein a bone filler material is filled through the hollow inner space and the hollow interior space into a space between the center shaft and the plurality of expandable plates, wherein after the bone filler material is solidified, the bone filler material assists maintaining a relative position between the center shaft and the plurality of expandable plates which are expanded and provides a strength to support an expanding degree of the plurality of expandable plates.

9. The trumpet expandable vertebral device assembly of claim 8, further comprising a handle which is fixedly connected with the inner tube, wherein a push or pull action of the handle controls the inner tube to move relatively to the outer tube.

10. The trumpet expandable vertebral device assembly of claim 9, wherein the handle includes an inner passage which communicates the hollow inner space of the inner tube with an exterior side of the handle, to allow a bone filler material to be filled through the inner passage, the hollow inner space of the inner tube and the hollow interior space, into a space between the center shaft and the plurality of expandable plates.

11. The trumpet expandable vertebral device assembly of claim 8, wherein each of the plurality of expandable plates has a thickness which increases from the tail end of the expandable plate which is away from the connection part to an end which is near the connection part.

* * * * *